United States Patent [19]

Marais et al.

[11] Patent Number: 5,087,334
[45] Date of Patent: Feb. 11, 1992

[54] CONTINUOUS PROCESS FOR THE MANUFACTURE OF POTASSIUM CHLORATE BY COUPLING WITH A SODIUM CHLORATE PRODUCTION PLANT

[75] Inventors: Dominique Marais, Gagny, France; Jesus Cóllantes, Sabinantigo,

[73] Assignee: Krebs & Cie, Bois D'Arcy, France

[21] Appl. No.: 340,090

[22] Filed: Apr. 18, 1989

[30] Foreign Application Priority Data

Apr. 22, 1988 [FR] France ............................ 88 05410

[51] Int. Cl.$^5$ ............................................. C25B 1/26
[52] U.S. Cl. ................................. 204/95; 423/475
[58] Field of Search ...................... 204/95; 423/475

[56] References Cited

U.S. PATENT DOCUMENTS

| | | | |
|---|---|---|---|
| 2,287,061 | 6/1942 | Osborne et al. | 23/85 |
| 3,180,811 | 4/1965 | Schwanbom et al. | 204/95 |
| 3,400,063 | 9/1968 | Boutillon | 204/95 |
| 3,407,128 | 10/1968 | Goerg | 204/95 |
| 3,574,095 | 4/1971 | Westerlund | 204/95 |
| 3,883,406 | 5/1975 | O'Brien et al. | 204/95 |
| 4,339,312 | 7/1982 | Brooks et al. | 204/95 |
| 4,405,418 | 9/1983 | Takemura | 204/95 |

FOREIGN PATENT DOCUMENTS 1104118 4/1954 France .

Primary Examiner—T. Tung
Attorney, Agent, or Firm—Schroeder & Siegfried

[57] ABSTRACT

The present invention relates to a continuous process for the manufacture of potassium chlorate by coupling with a plant for the production of sodium chlorate by electrolysis, the said plant comprising a source of NaCl solution, (1), a loop for purification of the said solution (2—2', 3), an electrolysis device (4), a storage tank (5), if appropriate, and a crystallizer (6) in which the crystallization and the separation of $NaClO_3$ crystals are preferably carried out, wherein circulating liquid is removed downstream of the said electrolysis device (4), a concentrated solution of potassium chloride is added to said liquid, precipitation (11) of the potassium chlorate is caused by any known means, the said potassium chlorate is separated off and the mother liquor from crystallization of the said potassium chlorate is recycled into the said purification loop (2—2', 3) of the sodium chlorate production plant.

16 Claims, 1 Drawing Sheet

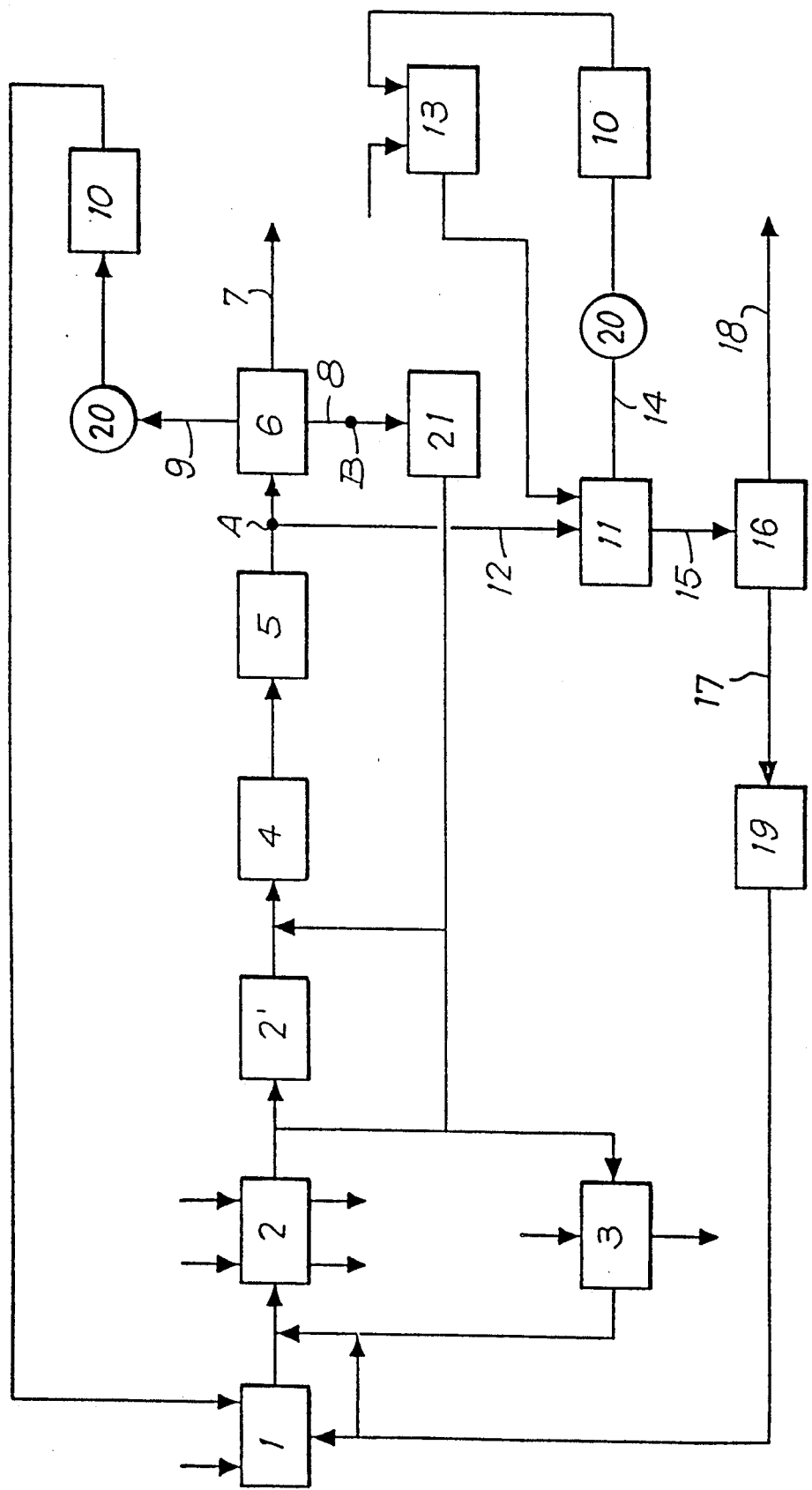

CONTINUOUS PROCESS FOR THE MANUFACTURE OF POTASSIUM CHLORATE BY COUPLING WITH A SODIUM CHLORATE PRODUCTION PLANT

The present invention relates to a continuous process for the manufacture of potassium chlorate by coupling with a sodium chlorate production plant.

In industry, potassium chlorate, $KClO_3$, is normally manufactured by a double decomposition reaction between sodium chlorate, $NaClO_3$, and potassium chloride, KCl:

$$NaClO_3 + KCl \rightarrow KClO_3 + NaCl \qquad (1).$$

This reaction takes place in aqueous solution and $KClO_3$ is easily separated off because of its poor solubility in the cold. As far as the starting materials are concerned, sodium chlorate, $NaClO_3$, is obtained by the electrolysis of a solution of sodium chloride, NaCl, and KCl is a natural mining product containing a number of impurities including sodium chloride.

It has been found that it is possible to carry out the double decomposition described above by continuously removing a part of the solution containing the sodium chlorate from the plant in which it is produced continuously by electrolysis, and then reinjecting the mother liquor from precipitation of the potassium chlorate, also continuously, into the electrolysis plant; it is this finding which constitutes the essential feature of the present invention. Wherever herein I have referred to the recycling of the mother liquor "into the purification loop", the term "into the purification loop" is intended to have a connotation sufficiently broad to include the return of said mother liquor to the purification loop, whether directly or indirectly.

This process obviously results in an increase in the concentration of K+ ions in the liquor, but this does not disturb the operation of the $NaClO_3$ plant as a whole if the operating conditions described below are observed.

This step was not obvious since it might have been thought that, because of the necessary mixing between the streams of the sodium chlorate and potassium chlorate production circuits, the impurities which were unavoidably present would have an adverse effect on the quality of the products obtained (sodium chlorate on the one hand and potassium chlorate on the other).

It will be recalled that plants for the continuous production of sodium chlorate by electrolysis involve the following steps:
(a)—Preparation of brine by dissolving NaCl.
(b)—Purification of the NaCl brine and adjustment of the electrolyte.
(c)—Electrolysis and reactions for converting NaCl to $NaClO_3$ via NaClO.
(d)—Intermediate storage to allow ageing, which is the end of the reaction converting $ClO-$ to $ClO_3-$ ions.
(e)—Crystallization of the $NaClO_3$.

Of course, it is only solutions which pass from one step to the next and the mother liquor from crystallization is returned to the purification step (b).

It may also be noted that:
the preparation of the brine (a) by dissolving NaCl can be carried out either in the plant or outside the actual plant itself; in the latter case, the plant is fed with a brine obtained in an appropriate manner.
the intermediate storage (d) is not an essential step; the plant need only have appropriate means for preventing the hypochlorite produced during electrolysis from causing problems in the downstream plants.
the $NaClO_3$ crystallization step (e) may not exist in certain plants, but the invention will preferably be applied—for reasons explained below—to the case of plants which do include the said $NaClO_3$ crystallization step.

The said crystallization step is dispensed with in cases where the $NaClO_3$ solution can be used directly.

In the process according to the invention, liquid circulating in the sodium chlorate production plant (a part of said liquid) is removed continuously, after the electrolysis step and a sufficient conversion of chloride to chlorate in the said plant, a concentrated solution of potassium chloride is added to said liquid, the potassium chlorate is precipitated and isolated and the mother liquor from crystallization of the potassium chlorate is then recycled during or before the purification step (b) in the sodium chlorate production plant.

The expression "concentrated solution" of potassium chloride is understood as meaning a saturated solution or a solution close to saturation.

It may be noted that the removal of circulating liquid after step (d) can be carried out either at the intermediate storage stage, or after this storage, or even after the crystallization step (e).

It is in fact apparent that:
after step (d), the composition of the circulating liquid is generally 100–120 g/l of NaCl and 530 to 600 g/l of $NaClO_3$ in industrial plants;
after the $NaClO_3$ crystallization step, the composition is generally 120–150 g/l of NaCl and 450–560 g/l of $NaClO_3$.

It has been shown that these two compositions contain sufficient amounts of $ClO_3-$ ions to achieve double decomposition in the presence of a sufficient amount of KCl, i.e. to achieve precipitation and afford the possibility of recovering the potassium chlorate under acceptable industrial conditions.

The amounts of potassium chloride to be used are such that, on the one hand, the flow rate of the solution containing (in particular) chlorate ions coming from the sodium chlorate synthesis plant and, on the other hand, the flow rate of the concentrated solution of potassium chloride are in a ratio of 1 to 3 and more particularly of 1.2 to 2.5.

To do this, it is necessary only to bring the flow rate of chlorate solution under the control of the flow rate of KCl brine, according to a given flow ratio R, in order to define the operating conditions of the electrolysis, $NaClO_3$ crystallization and $KClO_3$ crystallization plants as a whole:

$$R = \frac{\text{flow rate of chlorate liquor}}{\text{flow rate of KCl brine}}$$

This flow ratio R is chosen from a range of $1 < R < 3$. It should preferably be $1.2 < R < 1.9$ in the case of an electrolyte having the following concentrations:
NaCl between 100 and 120 g/l, for example equal to 110 g/l,
$NaClO_3$ between 530 and 600 g/l, for example equal to 560 g/l,
and a (concentrated) KCl brine having a concentration of, for example, 340 g/l; it should preferably be $1.3 < R < 2.5$ in the case of mother liquor from $NaClO_3$ crystallization having the following concentrations:

NaCl between 120 and 150 g/l, for example equal to 140 g/l,

NaClO$_3$ between 450 and 560 g/l, for example equal to 520 g/l, and a (concentrated) KCl brine having a concentration of, for example, 340 g/l.

To cause precipitation of the potassium chlorate from the solution, any known process can be used, such as concentration of the solution by evaporation under vacuum, or cooling with the aid of a brine or a refrigerating medium, or a combination of both these processes.

Finally, it may be pointed out that the flexibility of the process can be increased by making provision for a storage tank on the path for recycling of the mother liquor resulting from the crystallization and isolation of the potassium chlorate.

It has furthermore been found that this process for the manufacture of potassium chlorate by double decomposition, coupled with a plant for the production of sodium chlorate by electrolysis, produces the two chlorates with a good quality if two conditions are observed.

The first condition is to prevent accumulation of the impurities introduced with the potassium chloride. These introduced impurities are not normally sufficient to contaminate the precipitated potassium chlorate with the very pure chlorate solution coming from the electrolyte, but their accumulation should be avoided and it is for this reason that the mother liquor from crystallization of the potassium chlorate is recycled upstream of the sodium chloride purification step (b).

The second condition is to prevent the concentration of K+ ions from reaching a value at which the potassium chlorate would precipitate with the sodium chlorate.

In fact, the content of K+ ions in the sodium chlorate loop depends mainly on the production ratio of the two chlorates, P(KClO$_3$)/P(NaClO$_3$), since the flow rate of the mother liquor from the potassium chlorate is a direct function thereof, whereas the concentration of potassium in the same mother liquor does not vary greatly.

This apparently simple relationship cannot be illustrated with precise numerical values because the content of K+ ions also depends on the crystallization temperatures of each of the two chlorates, which in turn depend on arbitrary choices.

This process for the manufacture of potassium chlorate by double decomposition and coupling with a plant for the continuous production of sodium chlorate by electrolysis has several advantages:

(1) The mother liquor from crystallization of the KClO$_3$ is recovered. They still contains chlorate and potassium, which are expensive products, their recovery representing a good economic operation. Moreover, pollution caused by disposal of the mother liquor, which often happened in the past, is avoided.

(2) Recovery of the mother liquor permits at the same time the direct reutilization, without crystallization, of all the sodium chloride produced by the reaction as well as that introduced with the potassium chloride, which is an ordinary impurity in the latter salt and is not therefore a disadvantage in this process.

(3) This makes it possible to use KCl ores with a relatively high NaCl content.

It suffices to remove the insoluble substances during the preparation of the brine, and if the soluble impurities are not at a level which is capable of contaminating the freshly precipitated KClO$_3$, they will be removed by the purification infrastructure provided for the NaCl brine entering the NaClO$_3$ production loop.

(4) In the same way that the NaCl contained in KCl is utilized, the KCl contained in NaCl is also recovered and utilized.

In the past, in a plant producing NaClO$_3$ only, the concentration of K+ settled at a value such that all the potassium entering with NaCl came out with NaClO$_3$.

In the novel process, this potassium can be considered as a secondary source complementing the main source.

(5) The manufacture of KClO$_3$ becomes a continuous process, whereas the former techniques were often far from continuous. Here, matters are facilitated by the continuous withdrawal of chlorate electrolyte.

(6) The operations for the manufacture of potassium chlorate become extremely simple.

For the required hourly capacity X kg/h, the operator chooses a flow rate of potassium brine which is directly propotional to the amount X of KClO$_3$ to be manufactured; direct choice of the flow rate of KCl brine of constant and regulated concentration gives stoichiometric control over the supply of K+ ions which is necessary for the required production.

(7) The process affords energy savings.

In particular, it is no longer necessary to precrystallize the NaClO$_3$ used for the double decomposition reaction in order to achieve a high purity.

Furthermore, the electrolyte can be removed at the point where its temperature is the most suitable.

In the former processes, an NaCl hot crystallization plant recovered the by-product of double decomposition. This crystallization plant, operating at temperatures above 80° C. (preferably above 90° C.), was a substantial consumer of energy in the form of steam and the plant was expensive due to the use of corrosion-resistant materials suitable for very hot brines.

The non-limiting Example which follows will serve to illustrate the invention; this Example refers to one of the installation diagrams shown in the single FIGURE.

The sodium chlorate preparation loop comprises:

at 1, an apparatus in which a saturated solution of sodium chloride is prepared;

at 2—2' and 3, a system in which the solution coming from 1 is purified by chemical treatment; this removes in particular the calcium ions, the magnesium ions and the sulfate ions; the loop is completed, if necessary, by an ionic treatment;

at 4, an electrolysis device which essentially converts Cl− ions to ClO$_3$− ions; this device advantageously consists of one or more groups comprising electrolysis cells connected to a reactor, the said groups being assembled in series or in parallel from the point of view of the flow of the liquids;

at 5, a storage tank;

at 6, a crystallizer in which crystallization of the NaClO$_3$ is caused by known means; the following are extracted from this crystallizer: at 7, the solid crystalline NaClO$_3$; at 8, mother liquor, which is recycled into the purification system 2—2'-3 after passage through a storage tank 21; and at 9, water, which is sucked up by the pump 20, condensed at 10 and recycled into the saturation apparatus 1 (this water comes from evaporation under vacuum of the solution treated at 6).

According to the invention, the KClO$_3$ production loop is connected to this loop; the said KClO$_3$ production loop comprises:

a point of removal of solution circulating in the sodium chlorate loop, it being possible for this removal point to be either at A, between the tank 5 and the crystallizer 6, or at B, on the line 8 for the mother liquor leaving the crystallizer; in the FIGURE, the removal point is shown at A;

a tank 11 for mixing/crystallization of the $KClO_3$; this tank is fed on the one hand, via the line 12, with the solution removed at A or B, and on the other hand with a concentrated solution of KCl prepared in the tank 13; the following are extracted from the said tank 11: on the one hand, via the line 14, water, which is sucked up by the pump 20, condensed at 10 and recycled into 13 (when crystallization of the $KClO_3$ in the tank 11 is caused by concentration of the solution under vacuum), and on the other hand, via the line 15, a suspension of $KClO_3$ crystals, which is sent to a separator 16;

a separator 16, indirectly cooled by a liquid if appropriate, in which crystallization of the $KClO_3$ is completed and in which the $KClO_3$ is separated off (by filtration, centrifugation, etc.); the following are extracted from the filter 16: at 18, the crystalline $KClO_3$, and at 17, mother liquor from crystallization, which is sent to the purification system 2—2'-3, if appropriate after passage through a storage tank 19.

It may be noted that the mixing-crystallization-filtration operations can be carried out in a single apparatus. Crystallization-separation of the $KClO_3$ is carried out at a temperature of between $-10°$ C. and $+15°$ C. and preferably of between $0°$ C. and $5°$ C.; under these conditions, the bulk of the $KClO_3$ which is capable of forming, taking into account the ions present, is crystallized and the solution recycled into 2—2'-3 is poor in $ClO_3-$ and $K+$ ions.

What is claimed is:

1. A continuous process for the manufacture of potassium chlorate by coupling with a plant for the production of sodium chlorate by electrolysis, the said plant successively comprising, from upstream to downstream, a source of NaCl solution, a loop for purification of the said solution, an electrolysis device, and a crystallizer in which the crystallization and the separation of $NaClO_3$ crystals are preferably carried out, wherein the process is characterized by removing a portion of the circulating liquid downstream of the said electrolysis device, adding a concentrated solution of potassium chloride to said removed liquid at a flow rate between equal and one third of the flow rate of the circulating liquid to form potassium chlorate therewithin, precipitating the potassium chlorate within the removed liquid, separating the said potassium chlorate off while the separation of the sodium chlorate crystals is being accomplished, and recycling the mother liquor from crystallization of the said potassium chlorate to the said purification loop of the sodium chlorate production plant.

2. The process according to claim 1 wherein the said removal effected downstream of the electrolysis device corresponds to a liquid containing from 100 to 120 g/l of NaCl and from 530 to 600 g/l of $NaClO_3$, and wherein the ratio R of the flow rate of the said liquid to the flow rate of the concentrated potassium chloride brine is chosen between 1.2 and 1.9.

3. The process according to claim 1 wherein the said removal is effected downstream of a crystallizer present in the said plant and corresponds to a liquid containing 120-150 g/l of NaCl and from 450 to 560 g/l of $NaClO_3$, and wherein the ratio R of the flow rate of the said liquid to the flow rate of the concentrated potassium chloride brine is chosen between 1.3 and 2.5.

4. The process according to claim 1 wherein the precipitation and separation of the potassium chlorate are carried out at a temperature of between $-10°$ C. and $+15°$ C. and preferably of between $0°$ and $5°$ C.

5. The process defined in claim 1 wherein the mother liquor from crystallization of the potassium chlorate is introduced into the circulating liquid of the plant upstream of the purification loop of the sodium chlorate production plant.

6. A continuous process for the manufacture of potassium chlorate by coupling with a plant designed for the production by electrolysis of sodium chlorate by having successively, in fluid conveying relation from upstream to downstream, a source of sodium chloride solution, a loop for purifying the sodium chloride solution, an electrolysis device, a crystallizer in which the crystallization and separation of sodium chlorate crystals are carried out, said process comprising removing the sodium chlorate crystals from the crystallizer and removing only a portion of the circulating fluid carrying sodium chlorate downstream of said electrolysis device, adding a concentrated solution of potassium chloride to that removed circulating fluid in amounts such that the flow rate of the removed circulating fluid is 1 to 3 times greater than the flow rate of the added concentrated solution of potassium chloride to thereby form potassium chlorate crystals within said removed circulating fluid, crystallizing and removing the potassium chlorate crystals from the circulating fluids simultaneously with the removal of the sodium chlorate crystals from the crystallizer, and recycling the mother liquor from the crystallization of the potassium chlorate by introducing the mother liquor into the purification loop of the sodium chlorate manufacturing plant.

7. The process defined in claim 6 wherein the removal of the circulating fluid is accomplished upstream of the crystallizer.

8. The process defined in claim 6 wherein the removal of the circulating fluid is accomplished downstream of the crystallizer.

9. The process defined in claim 6 wherein the process is accomplished with the plant having a storage tank disposed in fluid transmitting relation intermediate its electrolysis device and its crystallizer.

10. The process defined in claim 9 wherein the removal of the circulating fluid is accomplished downstream of the storage tank of the plant.

11. The process defined in claim 9 wherein the removal of the circulating fluid is accomplished downstream of the storage tank and upstream of the crystallizer.

12. The process defined in claim 6 wherein the mother liquor is introduced into the circulating fluid carrying sodium chlorate upstream of the purification loop.

13. The process defined in claim 6 wherein each of the steps of said process are carried on continuously.

14. The process defined in claim 6 wherein the plant includes a storage tank interposed between the electrolysis device and the crystallizer.

15. A continuous process for the manufacture of potassium chlorate by coupling with a plant designed for the production by electrolysis of sodium chlorate by having successively, in fluid conveying relation from upstream to downstream, a source of sodium chloride solution, a loop for purifying the sodium chloride solution, an electrolysis device, a crystallizer in which the crystallization and separation of sodium chlorate crystals are carried out, said process comprising removing the sodium chlorate crystals from the crystallizer, simultaneously removing only a portion of the circulating fluid carrying sodium chlorate downstream of said electrolysis device, adding a concentrated solution of potassium chloride to that removed circulating fluid to thereby form potassium chlorate within said removed circulating fluid, crystallizing and removing potassium chlorate crystals from the circulating fluids simultaneously with the removal of the sodium chlorate crystals, and recycling the mother liquor from the crystallization of the potassium chlorate by introducing the mother liquor into the purification loop of the sodium chlorate manufacturing plant, the flow rate of the circulating fluid removed downstream of the electrolysis device being 1 to 3 times greater than the flow rate of the added concentrated solution of potassium chloride.

16. A continuous process for the simultaneous continuous commercial manufacture of both potassium chlorate and sodium chlorate by having successively, in fluid conveying relation from upstream to downstream, a source of sodium chloride solution, a loop for purifying the sodium chloride solution, an electrolysis device for producing sodium chlorate within the sodium chloride solution, a crystallizer in which the crystallization and separation of sodium chlorate crystals are carried out, said process comprising removing only a portion of the circulating fluid carrying sodium chlorate downstream of said electrolysis device, adding a concentrated solution of potassium chloride to that removed circulating fluid to thereby form potassium chlorate within said removed circulating fluids, crystallizing and removing potassium chlorate crystals from the removed circulating fluids while simultaneously removing sodium chlorate crystals from said crystallizer, and recycling the mother liquor from the crystallization of the potassium chlorate by introducing the mother liquor into the purification loop provided for purifying the sodium chloride solution while maintaining the flow rate of the circulatory fluid removed downstream of the electrolysis device at 1 to 3 times greater than the flow rate of the added concentrated solution of potassium chloride.

* * * * *

UNITED STATES PATENT AND TRADEMARK OFFICE
CERTIFICATE OF CORRECTION

PATENT NO.   : 5,087,334
DATED        : February 11, 1992
INVENTOR(S)  : Marais et al It is certified that error appears in the above-identified patent and that said Letters Patent is hereby corrected as shown below:

Column 3, line 53, cancel "They" and substitute therefor --It--.

Signed and Sealed this

Fifteenth Day of June, 1993

Attest:

MICHAEL K. KIRK

Attesting Officer

Acting Commissioner of Patents and Trademarks